US008814445B2

(12) United States Patent
Gallegos et al.

(10) Patent No.: US 8,814,445 B2
(45) Date of Patent: Aug. 26, 2014

(54) APPARATUS AND METHOD FOR GANGED MULTIPLE OPTICAL FIBER CONNECTOR

(75) Inventors: Yuri M. Gallegos, Plainfield, IL (US); Robert A. Reid, Monticello, IN (US); Jerry A. Wiltjer, Frankfort, IL (US)

(73) Assignee: Panduit Corp., Tinley Park, IL (US)

( * ) Notice: Subject to any disclaimer, the term of this patent is extended or adjusted under 35 U.S.C. 154(b) by 374 days.

(21) Appl. No.: 13/215,471

(22) Filed: Aug. 23, 2011

(65) Prior Publication Data
US 2013/0051733 A1 Feb. 28, 2013

(51) Int. Cl.
G02B 6/43 (2006.01)

(52) U.S. Cl.
USPC .................................. 385/89; 385/59; 385/71

(58) Field of Classification Search
None
See application file for complete search history.

(56) References Cited

U.S. PATENT DOCUMENTS

| | | | |
|---|---|---|---|
| 3,997,234 A | | 12/1976 | Worman |
| 4,070,081 A | * | 1/1978 | Takahashi ..................... 439/372 |
| 4,553,813 A | * | 11/1985 | McNaughton et al. ......... 385/89 |
| 4,779,952 A | * | 10/1988 | Hayashi et al. ................ 385/66 |
| 5,579,425 A | | 11/1996 | Lampert et al. |
| 5,675,682 A | * | 10/1997 | De Marchi ..................... 385/77 |
| 5,796,896 A | * | 8/1998 | Lee ................................. 385/59 |
| 6,109,978 A | | 8/2000 | Stellman et al. |
| 6,146,023 A | * | 11/2000 | Weigel ............................ 385/55 |
| 6,367,987 B1 | * | 4/2002 | Beier et al. ..................... 385/76 |
| 6,422,763 B1 | * | 7/2002 | Halbach et al. ................ 385/77 |
| 6,547,585 B2 | | 4/2003 | Bradley et al. |
| 6,796,844 B1 | | 9/2004 | Edwards, III |
| 6,857,900 B2 | | 2/2005 | Kleeberger et al. |
| 7,140,911 B1 | | 11/2006 | Rector et al. |
| 7,381,087 B2 | * | 6/2008 | Alvarez ..................... 439/540.1 |
| 7,588,373 B1 | | 9/2009 | Sato et al. |
| 2002/0137392 A1 | | 9/2002 | Wainio |
| 2007/0259560 A1 | | 11/2007 | Matsumoto |
| 2008/0311781 A1 | | 12/2008 | Wojcik et al. |
| 2010/0092134 A1 | * | 4/2010 | Donetsky et al. .............. 385/59 |

FOREIGN PATENT DOCUMENTS

DE 202010009146 U1 9/2010

* cited by examiner

Primary Examiner — Mike Stahl
(74) Attorney, Agent, or Firm — Christopher S. Clancy; Christopher K. Marlow

(57) ABSTRACT

An optical-fiber connection apparatus and method for connection of an optical-fiber cable having a plurality of optical fibers to a transmit/receive unit having a plurality of interface transceivers. Some embodiments include a housing having a base portion and a latch actuator, an optical-fiber cable connection that holds the optical-fiber cable to the housing, a plurality of optical-fiber termination interfaces coupled to the housing, and a lever mechanism that is coupled to the base portion and to the latch actuator, and that moves the latch actuator relative to the base portion, wherein the lever mechanism operates to latch the optical-fiber connection apparatus to the transmit/receive unit such that the plurality of the optical-fiber termination interfaces couples light signals between the plurality of optical fibers and the plurality of interface transceivers of the transmit/receive unit.

8 Claims, 9 Drawing Sheets

APPARATUS AND METHOD FOR GANGED MULTIPLE OPTICAL FIBER CONNECTOR

FIELD OF THE INVENTION

The present invention is generally directed to optical communication cable connectors for connecting multiple-fiber cables to a receiving connector.

BACKGROUND OF THE INVENTION

Fiber-channel switches are rapidly being deployed in data-center environments that require high-density, high-availability switch platforms, including storage area networks (SAN). Fiber-channel switches may be deployed one at a time or in larger multi-switch configurations and allow many-to-many communication, device name lookup, security, and redundancy.

Currently, fiber-channel switches are commercially available having up to 256 fiber ports, and connecting and disconnecting all the optical fibers during installation and maintenance of the fiber-channel switches is a time-consuming and error-prone undertaking. Furthermore, the large number of optical fibers that need to be connected to the fiber-channel switch is unwieldy and reduces accessibility to the fiber-channel switch. This makes the management of the fiber-channel switch difficult. In addition, the large number of optical fibers can reduce airflow in server cabinets, negatively impacting performance.

Fan-out optical-fiber cables (also referred to as optical-fiber break-out cables) are used to bundle multiple optical fibers together (e.g., four, six, eight, or more optical fibers) to reduce the clutter of having multiple optical fibers and to improve and ease deployment and installation of the multiple optical fibers in the datacenter or other such environment. Fan-out optical-fiber cables have multiple optical fibers bundled together in a single cable. At the end of the cable the multiple optical fibers are unbundled and "fan-out," with each optical fiber having an end connector (e.g., an optical-fiber LC connector). Therefore, while fan-out optical-fiber cables address the issue of managing large numbers of optical fibers, fan-out optical-fiber cables do not address the difficulty of connecting and disconnecting large numbers of optical-fiber connectors to and from each port of the fiber-channel switch.

There is a need in the art for a method and apparatus to simplify the connection of multiple-fiber cables to fiber-channel switches while simultaneously reducing the issues associated with managing the large number of individual optical fibers required in datacenters.

SUMMARY OF THE INVENTION

According to some embodiments, the present invention provides an optical-fiber connection apparatus for connection of an optical-fiber cable, having a plurality of optical fibers, to a receiver unit having a plurality of interface transceivers. The optical-fiber connection apparatus includes a housing having a base portion and a latch actuator, an optical-fiber cable connection that holds the optical-fiber cable to the housing, a plurality of optical-fiber termination interfaces coupled to the housing, and a lever mechanism that is connected to the optical-fiber connection apparatus and that moves the latch actuator relative to the base portion. The lever mechanism operates to latch the optical-fiber connection apparatus to the receiver unit such that each of the plurality of the optical-fiber termination interfaces couples light signals to a corresponding one of the plurality of interface transceivers of the transmit/receive unit.

According to other embodiments, the present invention provides a method for connecting an optical-fiber cable having a plurality of optical fibers to a receiver unit having a plurality of interface transceivers. The method includes providing a housing having a base portion and a latch actuator, providing a plurality of optical-fiber termination interfaces, providing a lever mechanism connected to the housing, holding the optical-fiber cable to the housing, holding the plurality of optical-fiber termination interfaces in the housing, and moving the latch actuator relative to the base portion to activate the lever mechanism to latch the plurality of optical-fiber termination interfaces to the plurality of interface transceivers of the transmit/receive unit such that each of the plurality of the optical-fiber termination interfaces couples light signals to a corresponding one of the plurality of interface transceivers of the transmit/receive unit.

DETAILED DESCRIPTION OF THE ILLUSTRATED EMBODIMENTS

Although the following detailed description contains many specifics for the purpose of illustration, a person of ordinary skill in the art will appreciate that many variations and alterations to the following details are within the scope of the invention. Accordingly, the following preferred embodiments of the invention are set forth without any loss of generality to, and without imposing limitations upon the claimed invention.

In the following detailed description of the preferred embodiments, reference is made to the accompanying drawings that form a part hereof, and in which are shown by way of illustration, specific embodiments in which the invention may be practiced. It is understood that other embodiments may be utilized and structural changes may be made without departing from the scope of the present invention.

One optical-fiber connector is the LC-type fiber connector, which is a small-form-factor connector (SFP) that was developed by Lucent Technologies (i.e., LC=Lucent Connector). The LC-connector generally uses a retaining tab mechanism, similar to a phone or RJ45 connector, and the connector body resembles the "squarish" shape of a standard SC connector. LC connectors are normally held together in a duplex configuration with a plastic clip. The ferrule diameter of an LC connector is 1.25 mm. Fiber cables transmit pulses of light instead of electrical signals, so the optical terminations must be much more precise than electrical terminations. Rather than merely allowing pins to make metal-to-metal contact, fiber-optic connectors must align glass fibers almost perfectly in order to allow for communication. While there are many different types of fiber connectors, they share similar design characteristics. Simplex means a single connector per end, while duplex means two connectors per end. There are typically three major components of a fiber connector: the ferrule, the connector body, and the coupling mechanism. The ferrule is a thin structure (often cylindrical) that actually holds the glass fiber and has a hollowed-out center that typically has a tight grip on the fiber. Ferrules are usually made from ceramic, metal, or high-quality plastic, and typically will hold one strand of fiber.

The connector body is a plastic or metal structure that holds the ferrule and attaches to the jacket and strength members of the fiber cable itself. The connector may be a latch clip, a bayonet-style nut, or similar device. One conventional LC connector makes use of an enhanced version of the well-known, RJ-style telephone connector.

Applications of LC connectors include telecommunications networks, local-area networks, data-processing networks, cable television, fiber-to-the-home, and premises distribution.

Figure 1A:
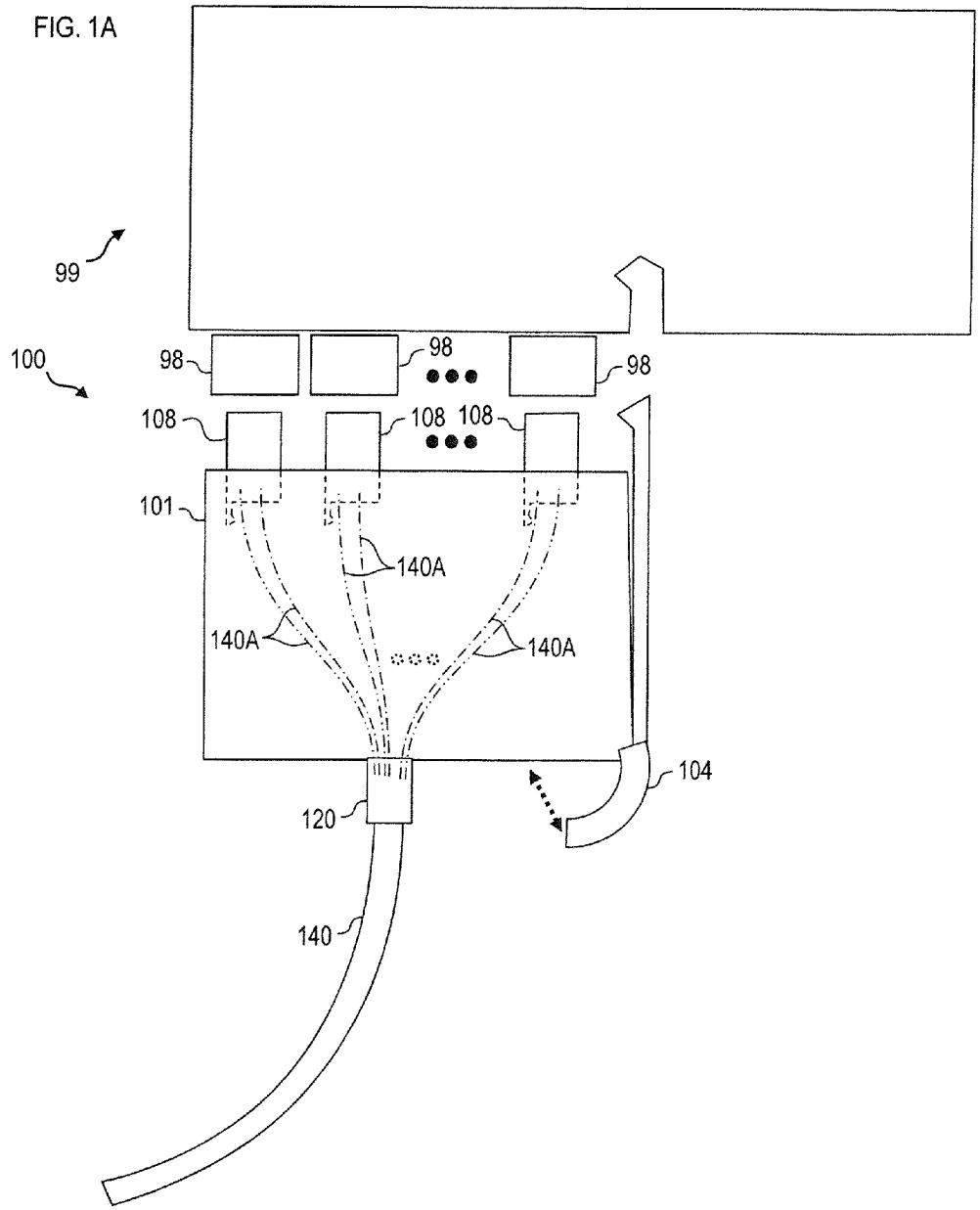
FIG. 1A is a conceptual schematic diagram of ganged multiple-fiber-optic connector 100 and transmit/receive unit 99, according to some embodiments of the present invention.

FIG. 1A is a conceptual schematic diagram of ganged Multiple-fiber-optic connector 100 and transmit/receive unit 99, wherein the transmit/receive unit 99 includes a plurality of transceiver units 98 that are each capable of receiving an optical-fiber connector. In some embodiments, ganged multiple-fiber-optic connector 100 includes a housing 101 configured to accept an optical-fiber cable 140 having a plurality of optical-fiber pairs 140A, secure the optical-fiber cable 140 to the housing 101 using an optical-fiber cable connection 118, separate the plurality of optical-fiber pairs 140A inside the housing 101, and physically connect and optically couple the plurality of optical-fiber pairs 140A to a plurality of optical-fiber termination interfaces 108. In some embodiments, each one of the plurality of optical-fiber termination interfaces 108 is configured to be connected and disconnected from housing 101, and thither is configured to receive one or more of the plurality of optical-fiber pairs 140A. Ganged multiple-fiber-optic connector 100 further includes a lever mechanism 104 coupled to the housing 101 and configured to connect and disconnect ganged multiple-fiber-optic connector 100 to transmit/receive unit 99, such that when ganged multiple-fiber-optic connector 100 is connected to transmit/receive unit 99, each one of the plurality of the optical-fiber termination, interfaces 108 couples light signals between an optical-fiber pair 140A and a corresponding one of the plurality of interface transceivers 98 of the transmit/receive unit 99.

Each one of the plurality of optical-fiber termination interfaces 108 and a corresponding one of the plurality of interface transceivers 98 may form reciprocal pairs. In some embodiments, each of the plurality of optical-fiber termination interfaces 108 is a "male-type" connector and each of the plurality of interface transceivers 98 is a "female-type" connector. Transmit/receive unit 99 optionally includes equipment that is useful for use in telecommunications networks, local-area networks, data processing networks, cable television, fiber-to-the-home, premises distribution, and the like.

As used herein, the term "ganged LC-hydra connector" refers to a particular ganged multiple-fiber-optic connector 100 embodiment, wherein the plurality of optical-fiber termination interfaces 108 includes LC-type fiber-optic connectors 108 (e.g., part numbers FLCSMEI, FLCSSBU, FLCDMEI, FLCDSBU, available from Panduit Corporation, Tinley Park, Ill. 60477). The plurality of optical-fiber termination interfaces 108 of ganged multiple-fiber-optic connector 100 may use other optical-fiber connector types using snap-type connector/receiver interfaces including, but not limited to, FDDI, SC, MT, MT-RJ, MU, MPO/MTP, and the like, and these other standard optical-fiber connector types may be substituted for the LC-type fiber-optic connectors in all of the embodiments described herein.

In some embodiments, the present invention provides a ganged LC-hydra optical-fiber connector—a device that clusters duplex LC connectors in a single housing that matches the transceiver pitch of blade switches for network connectivity. Fiber-channel switches generally have transceivers (i.e., optical-fiber ports that each have both a transmitter and a receiver) grouped in sets of four or six duplex ports and therefore, in some embodiments, the ganged LC-hydra connectors of the present invention include sets of four or six duplex LC connectors in a single housing. In other embodiments, the ganged LC-hydra connector includes simplex (i.e., either transmit or receive) or duplex (both transmit and receive) LC connectors in sets of two, three, four, five, six, seven, eight, nine, ten, or more. The ganged LC-hydra connectors of the present invention reduce the number of cables needed to populate a blade switch, and the reduction of cables increases accessibility to the blade switch and reduces the airflow restrictions that cable bundles otherwise cause in equipment cabinets.

The ganged LC-hydra connector of the present invention also allows the multiple LC connectors of the ganged LC-hydra connector to be connected and disconnected nearly simultaneously, thereby eliminating the confusion associated with installing each individual LC connector one-by-one into the ports of the switch. This helps to reduce installation time and cost. (Port-blades usually have transceivers grouped in sets of four or six duplex ports.)

Figure 1B:
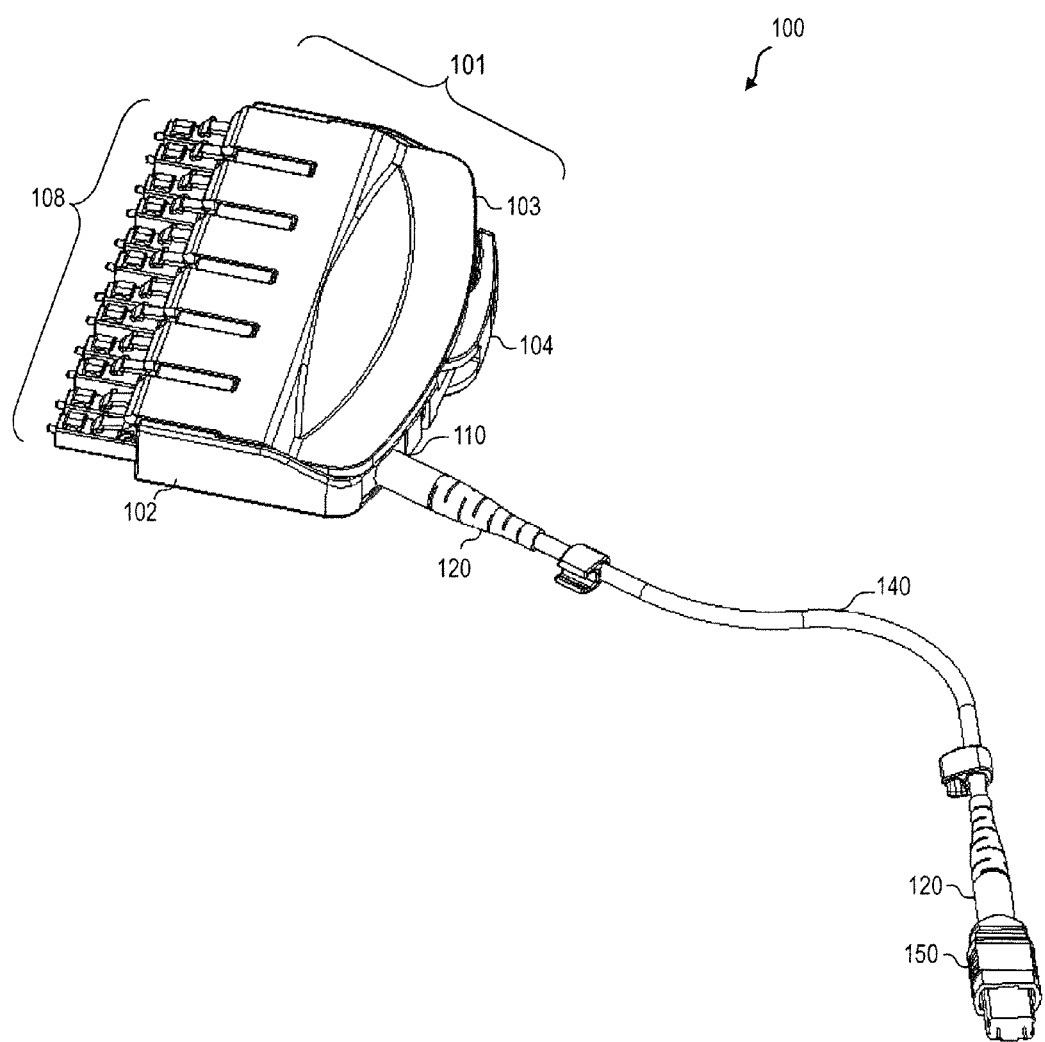
FIG. 1B is a perspective diagram of ganged multiple-fiber-optic connector 100, according to some embodiments of the present invention.

FIG. 1B is a perspective diagram of ganged LC-hydra connector 100, according to some embodiments of the present invention. Ganged LC-hydra connector 100 includes a housing 101 that is formed from the combination of a base 102 and a sliding lid 103, a lever 104 that is connected to the base 102 and configured to move sliding lid 103, a plurality of LC connectors that are disconnectably mounted to base 102, and a round-fiber cable 140 that enters the housing 101 through boot 120 and anchor cap 110. Round-fiber cable 140 includes a plurality of optical fibers connected at one end to housing 101, and at the other end to a multiple-optical-fiber connector 150 located at the other end of the round-fiber cable 140 that is distal from the housing 101.

Sliding lid 103 is movable with respect to base 102, and is configured to aid in the substantially simultaneous connection or disconnection of the plurality of LC connectors 108 to or from a corresponding plurality of LC receivers (e.g., interface transceivers 98, as shown in FIG. 1A, (e.g., part numbers CMDSLC or CMDJLCZ, available from Panduit Corporation, Tinley Park, Ill. 60477)). The plurality of optical fibers contained in the round-fiber cable 140 may be single-mode optical fibers, multi-mode optical fibers, or a combination of both single-mode optical fibers and multi-mode optical fibers.

In some embodiments, the round-fiber cable 140 includes six pairs of optical fibers and the ganged LC-hydra connector 100 includes an equal number of LC connectors 108. In some embodiments, multiple-optical fiber connector 150 includes an MPO-type fiber connector. In some embodiments, the round-fiber cable 140 enters the housing 101 on a side that is opposite to the plurality of LC connectors 108.

Figure 2:
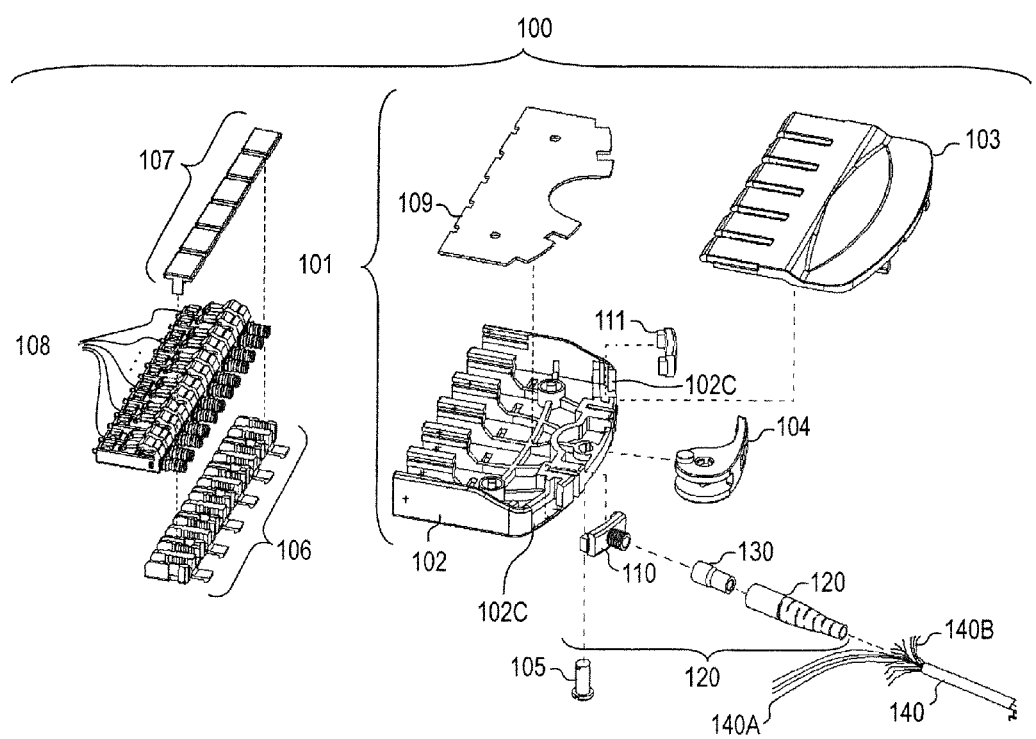
FIG. 2 is an exploded-view perspective diagram of ganged multiple-fiber-optic connector 100, according to some embodiments of the present invention.

FIG. 2 is an exploded-view perspective diagram of ganged multiple-fiber optic connector 100, according to some embodiments of the present invention. The plurality of optical fibers of round-fiber cable 140 are fed through the housing 101 and connected to respective LC connectors 108. The plurality of optical fibers of round-fiber cable 140 are protected from the movement of a latch activation such as sliding lid 103 by protective cover 109 when the optical fibers are inside housing 101. In some embodiments, the protective cover 109 is made of a sheet of thin flexible plastic transparent (e.g., Mylar®) to prevent the plurality of optical fibers of round-fiber cable 140 from entangling on sliding lid 103. The round-fiber cable 140 enters housing 101 through anchor cap 110 which is located in one of the two base openings 102C included in base 102. Base opening 102C, (i.e., the base opening 102C that does not have the anchor cap) is covered by an insert 111 to prevent dust or other such particulate contaminants from entering housing 101. In some embodiments, anchor cap 110 and insert 111 are interchangeable during assembly, in order to provide ganged LC-hydra connector 100 with the ability to have either a left or right configuration.

An axle 105 is attached to base 102 through the opening in lever 104 such that lever 104 is movably attached to base 102 and rotates around axle 105. In addition, axle 105 and base 102 movably secure sliding lid 103 to base 102 and prevent sliding lid 103 from coming off. Lever 104 can be oriented to either side of housing 101, depending on the placement of anchor cap 110 in base opening 102C.

Each one of the plurality of LC connectors 108 is mounted on a sled 106 and is secured to sled 106 by sled clip 107, which is configured to be removably attached to sled 106.

Sled 106 is configured to be removably attached to base 102 and therefore sled 106, when used in combination with sled clip 107 is capable of securing one or more of the plurality of LC connectors 108 to base 102. In some embodiments, sled 106 is configured to receive more than one LC connector 108, and sled clip 107 is configured to secure more than one LC connector 108. In some other embodiments, sled 106 is configured to receive more than one LC connector 108; however, sled clip 107 is configured to secure only a single LC connector and therefore the number of sleds 106 and sled clips 107 required to secure the total number of LC connectors 108 are not necessarily equal. Similarly, in yet other embodiments, sled 106 is configured to receive a single LC connector 108, and sled clip 107 is configured to secure more than one LC connector 108.

Round-fiber cable 140 includes a plurality of optical-fiber pairs 140A and a cable jacket 140B (which, in some embodiments, is made of Kevlar® or similar polymer material) and the optical-fiber pairs 140A are attached to anchor cap 110 by crimping cable jacket 140B to anchor cap 110 with a crimp sleeve 130. A boot 120 is configured to provide strain relief for the round-fiber cable 140 and is pushed over crimp sleeve 130.

Figure 3A:
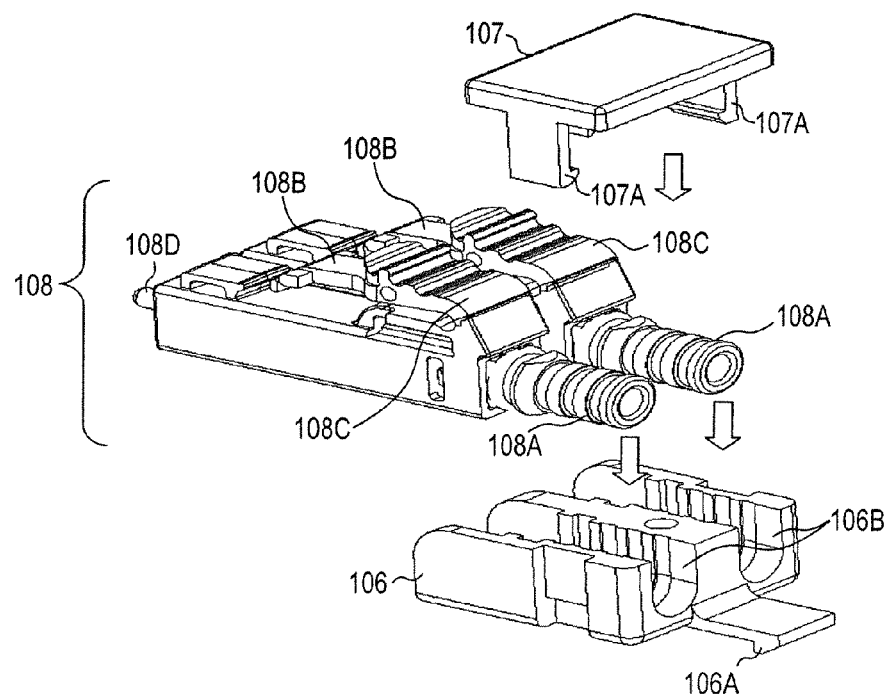
FIG. 3A is an exploded-view perspective diagram of LC connectors 108, sled 106, and sled clip 107, according to some embodiments of the present invention.

FIG. 3A is an exploded-view perspective diagram of LC connectors 108, sled 106, and sled clip 107, according to some embodiments of the present invention, showing how LC connectors 108 are mounted on sleds 106 and secured with sled clip 107. FIG. 3A shows two simplex LC connectors 108 (useful for connecting one pair of fibers, e.g., one transmit fiber and one receive fiber) that each include a backbone 108A configured to receive an optical fiber (e.g., one of the plurality of optical-fiber pairs 140A as shown in FIG. 2) and optically couple light signals from the optical fiber to optical termination 108D, latches 108B that are configured to removably connect and secure LC connector 108 to a respective LC-type transceiver 98, and front ramps 108C that are configured to interface with sliding lid 103, as shown in FIG. 2, such that sliding lid 103 slides along front ramp 108C and causes latch 108B to either connect or disconnect from its respective LC-type transceiver. More in-depth details regarding the operation of connecting and disconnecting LC connector 108 to and from the LC-type transceiver are provided below.

As shown in FIG. 3A, sled 106 is configured to receive LC connector 108 (i.e., sled 106 has grooves 106B that match connector backbone 108A of LC connector 108), and LC connector 108 is secured in place with sled clip 107 using sled-clip hooks 107A that are configured to attach to sled 106. In addition, sled 106 includes a catch 106A configured to attach sled 106 to base 102 and a stop 106C configured to control the position of sled 106 on base 102.

Figure 3B:
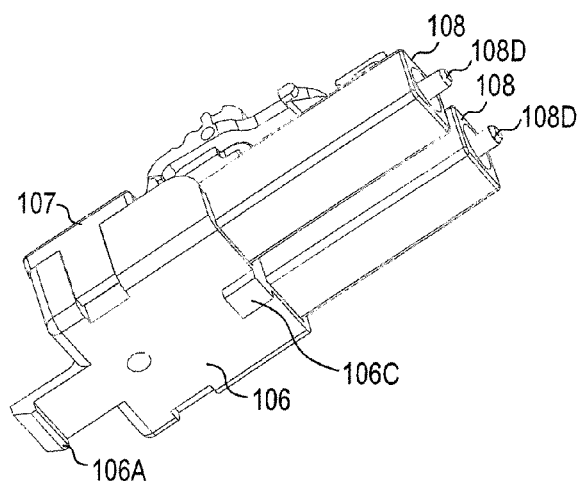
FIG. 3B is a bottom-up perspective-view diagram of LC connectors 108, sled 106, and sled clip 107, assembled together, according to some embodiments of the present invention.

FIG. 3B is a bottom-up perspective-view diagram of a pair of LC connectors 108, sled 106, and sled clip 107, assembled together, according to some embodiments of the present invention.

Figure 4A:
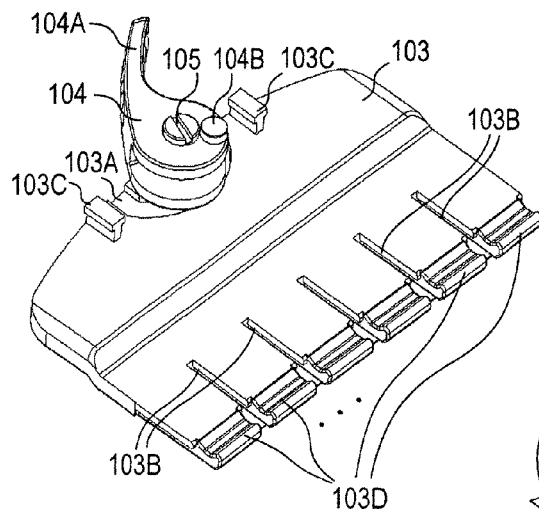
FIG. 4A is a perspective diagram of the bottom side of sliding lid 103, lever 104, and axle 105, according to some embodiments of the present invention.

FIG. 4A is a perspective diagram of the bottom side of sliding lid 103, lever 104, and axle 105, according to some embodiments of the present invention. As shown in FIG. 4A, lever 104 includes lever arm 104A that is used to rotate lever 104 around axle 105 (as discussed above, lever 104 is movably attached to base 102 with axle 105, however base 102 is not shown in FIG. 4A in order to show the location and interaction of lever 104 and sliding lid 103 and guide pin 104B that is configured to travel within a curved channel 103A formed in sliding lid 103 and move sliding lid 103 back and forth such that sliding lid 103 causes the plurality of LC connectors 108 to substantially simultaneously connect to or disconnect from a plurality of LC transceivers 98.

Sliding lid 103 includes curved channel 103A configured to accept guide pin 104B, rails 103C configured to be inserted into base tracks 102B (shown in FIG. 5) in order to keep sliding lid 103 and base 102 properly aligned, tip tracks 103B configured to align sliding lid 103 and the plurality of LC connectors, and ramp 103D configured to provide mechanical pressure to front ramp 108C to cause latch 108B to engage or disengage from the respective LC-type transceiver.

Figure 4B:
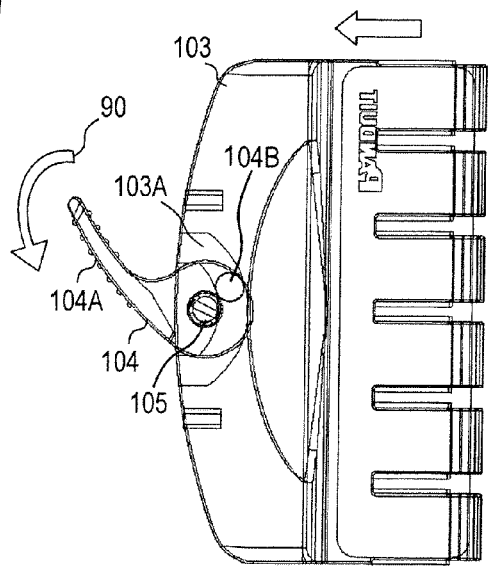
FIG. 4B is a top-down-view diagram of sliding lid 103, lever 104, and axle 105, according to some embodiments of the present invention.

FIG. 4B is a top-down-view diagram of sliding lid 103, lever 104, and axle 105, according to some embodiments of the present invention.

In some embodiments, ganged LC-hydra connector 100 operates in a manner that uses guide pin 104B and curved channel 103A, one advantage of which is that slide lid 103 is guided by the rotation of lever 104 around axle 105, thereby allowing for a continuous motion and actuation of the plurality of LC connectors 108 during engagement to or disengagement from transmit/receive unit 99.

When lever arm 104A is pulled, causing lever 104 to rotate around axle 105, guide pin 104C travels in curved channel 103A and thereby pulls sliding lid 103 in a direction that is away from the optical termination 108D of the plurality of LC connectors 108. To ensure that sliding lid 103 traverses in a straight direction, rails 103C on sliding lid 103 travel inside base tracks 102B in base 102.

Figure 5:
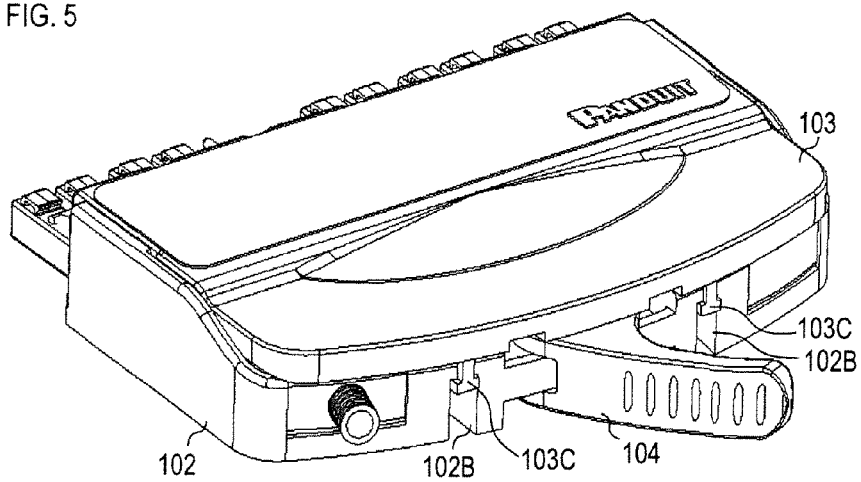
FIG. 5 is a perspective diagram of ganged multiple-fiber-optic connector 100, including base 102, sliding lid 103, and lever 104, according to some embodiments of the present invention.

FIG. 5 is a perspective diagram of ganged multiple-fiber-optic connector 100, including base 102, sliding lid 103, and lever 104, according to some embodiments of the present invention that details the location of both rails 103C included on sliding lid 103 and base tracks 102B included in base 102.

As used herein, latch 104 is considered to be in an "open" position when latch arm 104A has been pulled or rotated in a direction away from both base 102 and sliding lid 103 (e.g., latch 104 is shown in an "open" position in FIG. 4A, FIG. 4B, and FIG. 5) such that sliding lid 103 traverses in a direction away from the optical termination 108D of the plurality of LC connectors 108 and applies sufficient force to LC-connector ramp 108C to unlatch LC connector 108 from LC transceiver 98, thereby allowing LC connector 108 to be disconnected from transmit/receive unit 99. As used herein, latch 104 is considered to be in a "closed" position when latch arm 104A has been pushed or rotated in a direction towards both base 102 and sliding lid 103, such that latch 104 is positioned closest to base 102 and sliding lid 103 (e.g., latch 104 is shown in a "closed" position in FIG. 1B). When latch 104 is in a "closed" position, sliding lid 103 applies little, if any, force to the LC-connector ramp 108C, thereby allowing LC-connector latch 108B to latch into the LC transceiver 98.

Figure 6A:
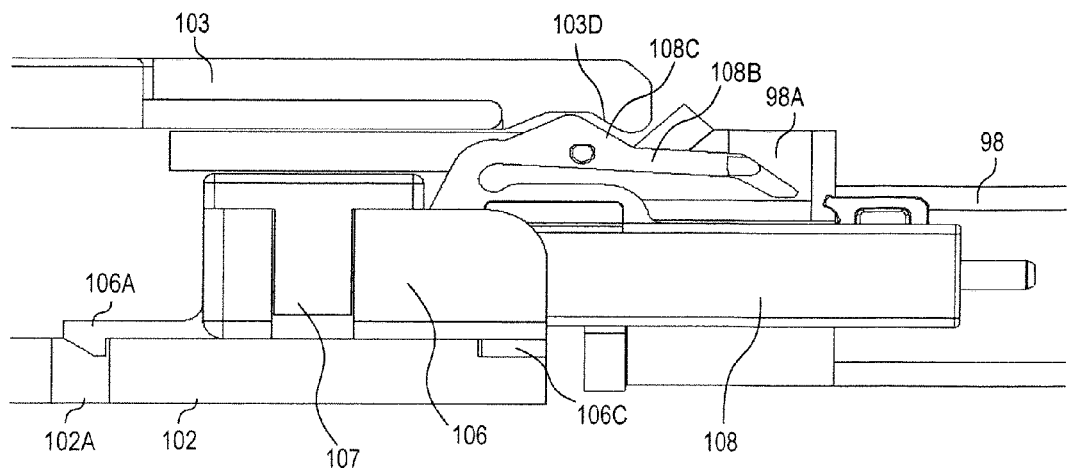
FIG. 6A is a cross-section diagram of a single LC connector 108 of ganged multiple-fiber-optic connector 100 engaged with transceiver 98, according to some embodiments of the present invention.

FIG. 6A is a cross-section diagram of a single LC connector 108 of ganged multiple-fiber-optic connector 100 engaged with LC transceiver 98, according to some embodiments of the present invention. FIG. 6A represents the state of ganged multiple-fiber-optic connector 100 when latch 104 is closed and the plurality of LC connectors is connected to a respective plurality of LC transceivers 98. A portion of sliding lid 103 is shown that includes a sliding-lid ramp 103D configured to slide along LC-connector front ramp 108C to depress the LC-connector latch 108B. LC connector 108 is held by the combination of sled 106 and sled clip 107, which form an assembly. This assembly is attached to base 102 with LC-connector catch 106A attached to base window 102A. As shown in FIG. 6A, sliding lid 103 is in the forward position and is not depressing the LC-connector latch 108B, and therefore LC-connector latch 108B is latched to LC-receiver catch 98A.

Figure 6B:
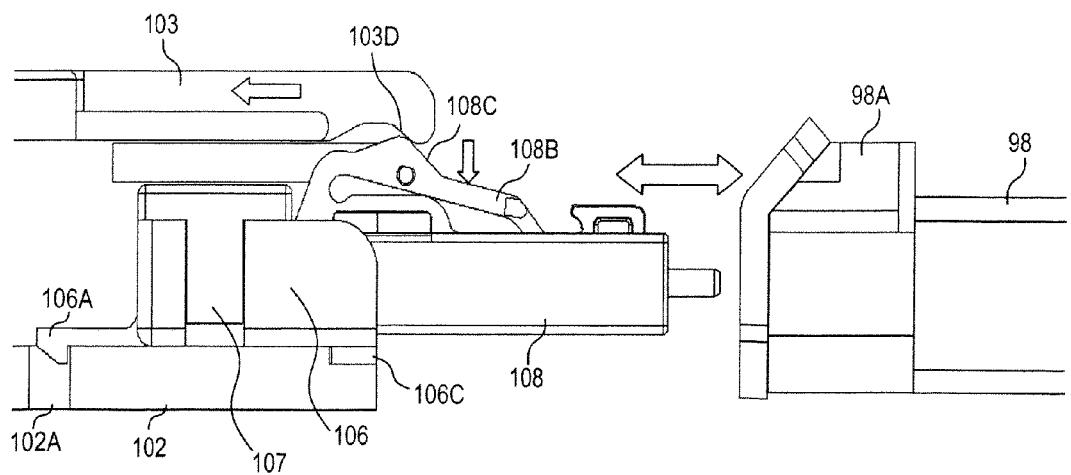
FIG. 6B is a cross-section diagram of a single LC connector 108 of ganged multiple-fiber-optic connector 100 after being disengaged from transceiver 98, according to some embodiments of the present invention.

FIG. 6B is a cross-section diagram of a single LC connector 108 of ganged multiple-fiber-optic connector 100 after being disengaged from transceiver 98, according to some embodiments of the present invention.

To disengage LC connector 108, latch 104 is moved to the "open" position as described above, such that sliding lid 103 is pulled in the direction away from the LC connector causing sliding-lid ramp 103D to depress LC-connector front ramp 108C of LC-connector latch 108B and disengage from a transceiver 98. This disengagement mechanism has the benefit of moving sliding lid 103 in the same direction that ganged LC-hydra connector 100 is going to be pulled in order to disengage the plurality of LC connectors from the corresponding plurality of LC transceivers 98 or transmit/receive unit 99.

FIG. 6A and FIG. 6B also illustrate how the assembly of sled 106, LC connector 108, and sled clips 107 are attached to base 102 via sled catch 106A engaging base window 102A of the base 102. Stop 106C is provided to prevent sled 106 from going further than desired inside base 102.

Figure 7:
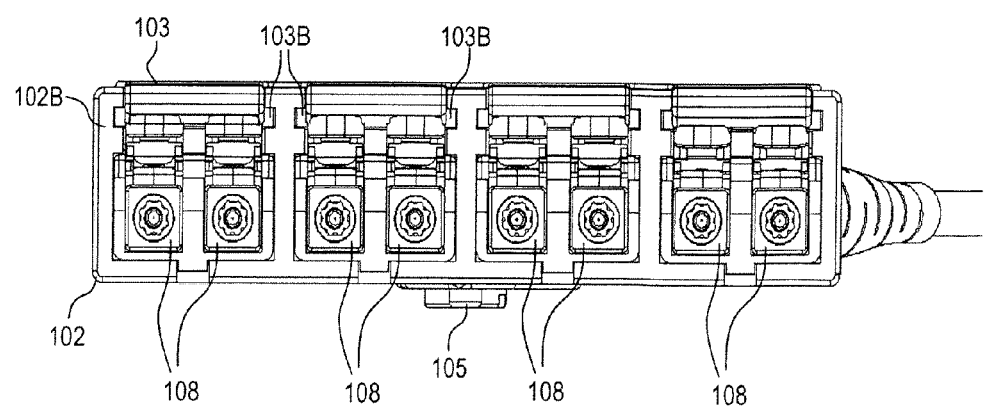
FIG. 7 is a front-view diagram of ganged multiple-fiber-optic connector 100, including base 102, sliding lid 103, LC connectors 108, and axle 105, according to some embodiments of the present invention.

FIG. 7 is a front-view diagram of ganged multiple-fiber-optic connector 100, including base 102, sliding lid 103, LC connectors 108, and axle 105, according to some embodiments of the present invention. FIG. 7 shows a front view of ganged LC-hydra connector 100 and illustrates how the tip tracks 103B of sliding lid 103 fit in the base tracks 102B of base 102. In this way, sliding lid 103 is contained and travels inside the base 102, allowing each LC connector to be disengaged at the same time.

Figure 8A:
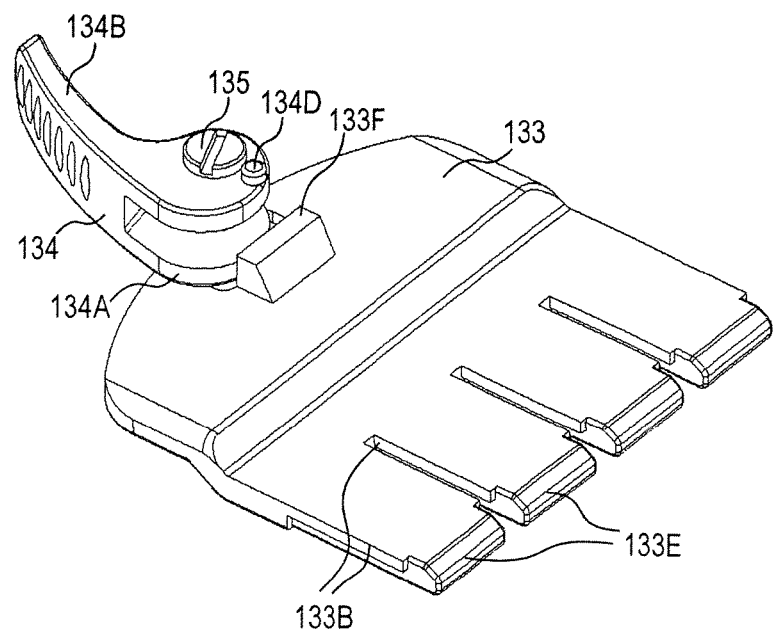
FIG. 8A is a perspective diagram of the bottom side of alternative sliding lid 133, lever 134, and axle 135, according to some embodiments of the present invention.
Figure 8B:
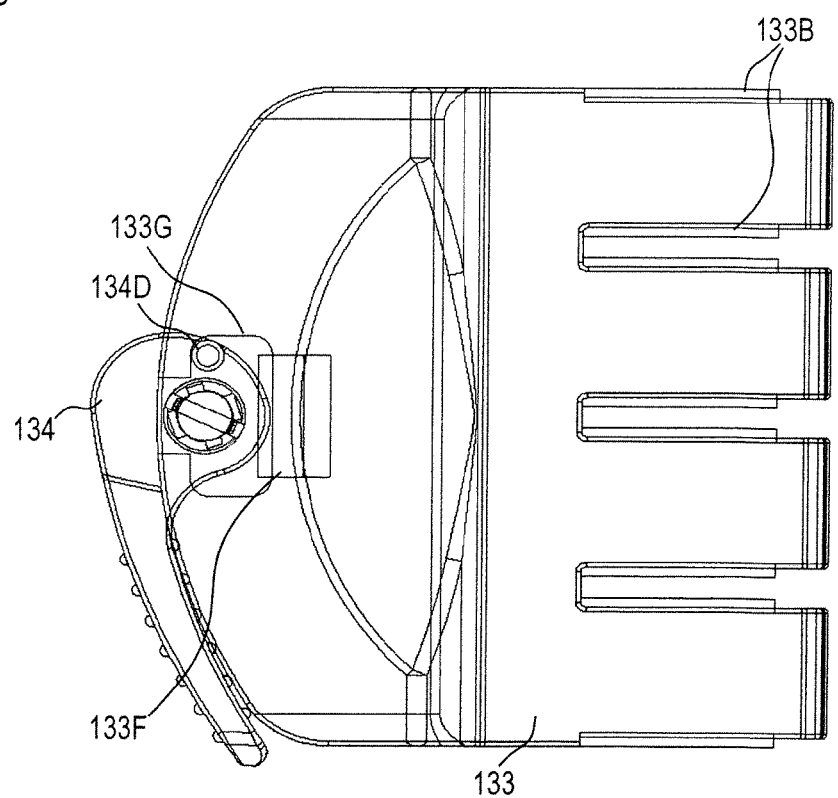
FIG. 8B is a top-down-view diagram of alternative sliding lid 133, lever 134, and axle 135, according to some embodiments of the present invention.

FIG. 8A is a perspective diagram of the bottom side of alternative sliding lid 133, lever 134, and axle 135, and FIG. 8B is a top-down-view diagram of alternative sliding lid 133, lever 134, and axle 135, according to some embodiments of the present invention. As shown in FIG. 8A and FIG. 8B, the operation is similar to the operation of sliding lid 103 and lever 104 of FIG. 1B, except that the operation of sliding lid 133 with lever 134 is reversed from the movement of sliding lid 103 and lever 104. Sliding lid 133 and lever 134 operate in the following manner: when lever arm 134B of lever 134 is rotated away from the sliding lid 133, cam 134A pushes against the follower 133F on sliding lid 133, thereby moving sliding lid 133 forward in a direction away from LC connectors 108. To return sliding lid 133 to its starting position, lever arm 104B is rotated back towards sliding lid 133, thereby causing return pin 134D to pull sliding lid 133 by exerting force on the walls of return cavity 133G. In some embodiments, sliding lid 133 and lever 134 are included in ganged LC-hydra connector 100.

Figure 9A:
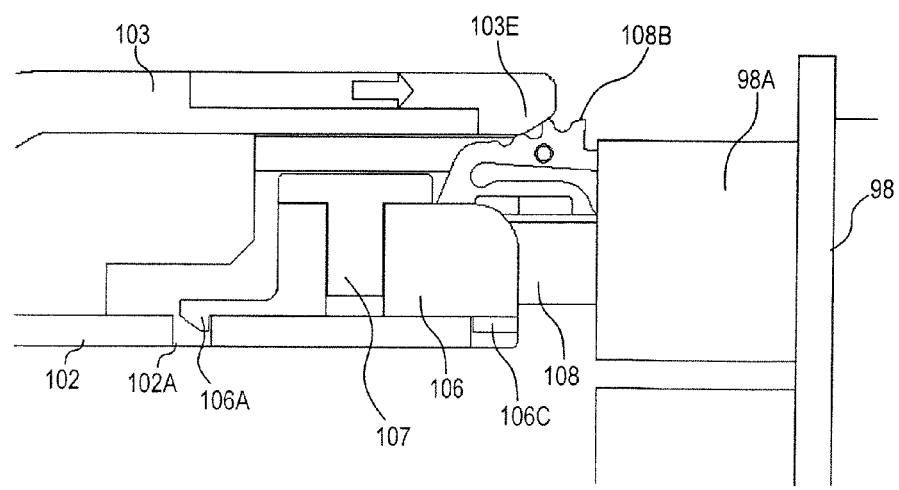
FIG. 9A is a cross-section diagram ala single LC connector 108 of ganged multiple-fiber-optic connector 100, including alternative sliding lid 133, engaged with transceiver 98, according to some embodiments of the present invention.
Figure 9B:
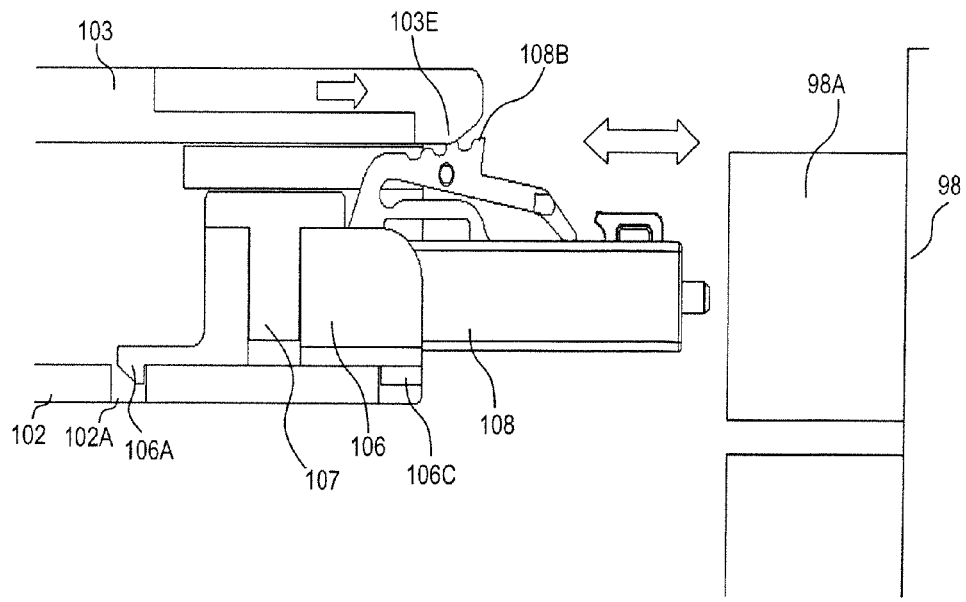
FIG. 9B is a cross-section diagram of a single LC connector 108 of ganged multiple-fiber-optic connector 100, including alternative sliding lid 133, after being disengaged from transceiver 98, according to some embodiments of the present invention.

FIG. 9A is a cross-section diagram of a single LC connector 108 of ganged multiple-fiber-optic connector 100, including alternative sliding lid 133, engaged with transceiver 98A, according to some embodiments of the present invention. FIG. 9B is a cross-section diagram of a single LC connector 108 of ganged multiple fiber-optic connector 100, including alternative sliding lid 133, after being disengaged from transceiver 98A, according to some embodiments of the present invention.

FIG. 9A and FIG. 9B show that while lever 134, as shown in FIG. 8A and FIG. 5B, is rotated towards the "open" position, thereby moving the sliding lid 103 forward, wedge 103E on the front of sliding lid 103 provides pressure to the LC connector latch 108B. The pressure on the LC-connector latch 108B substantially simultaneously disengages the LC connectors 108 from either an adapter or transceiver 98, as shown in FIG. 9B.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. An optical-fiber connection apparatus for connection of an optical-fiber cable having a plurality of optical fibers to a transmit/receive unit having a plurality of interface transceivers, the apparatus comprising:
   a housing having a base portion and a latch actuator;
   an optical-fiber cable connection that holds the optical-fiber cable to the housing;
   a plurality of optical-fiber termination interfaces coupled to the housing; and
   a lever mechanism that is coupled to the base portion and to the latch actuator, and that moves the latch actuator relative to the base portion, wherein the lever mechanism operates to latch the optical-fiber connection apparatus to the transmit/receive unit such that the plurality of the optical-fiber termination interfaces couples light signals between the plurality of optical fibers and the plurality of interface transceivers of the transmit/receive unit wherein the lever mechanism includes a lever arm that rotates from a first latched position to a second unlatched position and wherein the lever mechanism moves the latch actuator towards the interface transceivers to be in the latched position.

2. The optical-fiber connection apparatus of claim 1, further comprising a retention mechanism between the base portion and the latch actuator coupled to receive the plurality of optical-fiber termination interfaces and to latch the plurality of optical-fiber termination interfaces to the optical-fiber connection apparatus.

3. The optical-fiber connection apparatus of claim 1, wherein each of the plurality of optical-fiber termination interfaces connects to two or more of the plurality of optical fibers.

4. A method for connecting an optical-fiber cable having a plurality of optical fibers to a transmit/receive unit having a plurality of interface transceivers, the method comprising:
   providing an optical-fiber connection system having a housing, the housing including a base portion and a latch actuator;
   coupling light signals between the plurality of optical fibers and the plurality of interface transceivers of the transmit/receive unit;
   holding the optical-fiber cable to the housing;
   connecting the plurality of optical fibers to the plurality of optical-fiber termination interfaces;
   holding the plurality of optical-fiber termination interfaces in the housing; and
   latching the optical-fiber connection system to the transmit/receive unit by moving the latch actuator relative to the base portion to latch the optical-fiber connection system to the transmit/receive unit wherein the optical connection system includes a lever arm, and wherein said latching the optical-fiber connection system to the transmit/receive unit comprises rotating the lever arm between a first latched position and a second unlatched position and wherein the rotating of the lever arm to the latched position further includes moving the latch actuator towards the interface transceivers.

5. The optical-fiber connection method of claim 4, wherein the optical-fiber connection system further includes a plurality of optical-fiber termination interlaces, and wherein the method further comprises latchably retaining the plurality of optical-fiber termination interfaces to the housing.

6. The optical-fiber connection method of claim 4, wherein the coupling of light signals includes connecting two or more of the plurality of optical fibers to each of the plurality of interface transceivers.

7. An optical-fiber connection apparatus for connection of an optical-fiber cable having a plurality of optical fibers to a transmit/receive unit having a plurality of interface transceivers, the apparatus comprising:
   a housing having a latch actuator and a base portion;
   means for coupling light signals between the plurality of optical fibers and the plurality of interface transceivers of the transmit/receive unit, wherein the means for coupling light signals is coupled to the housing;
   means for holding the optical-fiber cable to the housing;
   means for connecting the plurality of optical fibers to the means for coupling light signals;
   means for holding a plurality of optical-fiber termination interfaces in the housing; and
   means for connecting and disconnecting the optical-fiber connection system to the transmit/receive unit, wherein the means for connecting and disconnecting further includes means for moving the latch actuator relative to the base portion to connect or disconnect the means for coupling light signals to the plurality of interface transceivers of the transmit/receive unit wherein the means for connecting and disconnecting further includes rotatable means for moving the latch actuator towards the interface transceivers to achieve a latched condition.

8. The apparatus of claim 7, further comprising means for latchably retaining the means for coupling light signals to the housing.

* * * * *